United States Patent

Santi et al.

[11] Patent Number: 6,066,706
[45] Date of Patent: May 23, 2000

[54] PROCESS FOR THE PREPARATION OF CRYSTALLINE VINYLAROMATIC POLYMERS WITH A PREDOMINATELY SYNDIOTACTIC STRUCTURE

[75] Inventors: Roberto Santi, Novara; Giuseppe Cometti, Verbania Pallanza; Riccardo Po', Leghorn, all of Italy

[73] Assignee: Enichem S.p.A., Milan, Italy

[21] Appl. No.: 08/716,882

[22] Filed: Sep. 20, 1996

[30] Foreign Application Priority Data

Oct. 27, 1995 [IT] Italy ................... MI95A2216

[51] Int. Cl.[7] .................. C08F 4/642; C08F 12/06
[52] U.S. Cl. .................. 526/160; 526/133; 526/134; 526/153; 526/161; 526/165; 526/347.2; 526/943
[58] Field of Search ................... 526/133, 134, 526/153, 160, 161, 165, 347.2, 943

[56] References Cited

U.S. PATENT DOCUMENTS

| Re. 35,289 | 7/1996 | Ishihara et al. ........... 526/160 X |
| 5,066,741 | 11/1991 | Campbell, Jr. ........... 526/171 |
| 5,142,005 | 8/1992 | Albizzati et al. ........... 526/125 |

FOREIGN PATENT DOCUMENTS 0271874  6/1988  European Pat. Off. ........... 526/161

OTHER PUBLICATIONS

European Search Report issued Nov. 18, 1996 in European application No. EP 96 11 4876. (2 pages).
U.S.S.N. 08/654,202, filed May 28, 1996.
U.S.S.N. 08/649,320, filed May 17, 1996.

*Primary Examiner*—Fred Teskin
*Attorney, Agent, or Firm*—Watson Cole Stevens Davis, P.L.L.C.

[57] ABSTRACT

Process for the preparation of crystalline vinylaromatic polymers with a predominantly syndiotactic structure which comprises polymerizing the vinylaromatic monomers, alone or mixed with at least another copolymerizable ethylenically unsaturated monomer, in the presence of a catalytic system essentially consisting of:

a) an adduct between a derivative of titanium having the formula $R_1R_2R_3R_4Ti$ and a calix-[n]-arene, or an oxa-calix-[n]-arene;
b) a co-catalyst selected from an alkylalumoxane and a compound of boron having the formula (II):

$$BX_1X_2X_3$$

or its salt.

8 Claims, No Drawings

PROCESS FOR THE PREPARATION OF CRYSTALLINE VINYLAROMATIC POLYMERS WITH A PREDOMINATELY SYNDIOTACTIC STRUCTURE

The present invention relates to a process for the preparation of vinylaromatic crystalline polymers with a predominantly syndiotactic structure.

More specifically, the present invention relates to a process for the preparation of crystalline polystyrene in which the polymeric chains have an essentially syndiotactic configuration.

Polystyrene is a thermoplastic polymer obtained by the radicalic polymerization of styrene and is used in the production of moulded articles, films, electric materials, materials for packaging, etc. It is an atactic, amorphous polymer, having excellent insulating properties and reasonable thermal resistance. For numerous applications it is preferable however to use crystalline materials with a high thermal resistance and resistance to solvents, characteristics which atactic polystyrene does not have.

European patent 210.615 describes a polystyrene having a structure characterized by an extremely high degree of stereoregularity, in which the phenyl substituents are arranged to provide a syndiotactic polymer. This material does not have the above disadvantages of atactic polystyrene as it is crystalline and therefore, once transformed, can be subjected to orientation processes, it is almost completely insoluble in organic solvents and has a melting point within the range of 260–280° C. and therefore has a high thermal resistance, comparable to or higher than that of condensation thermoplastic polymers (polyesters, polyamides, polyimides, etc).

Syndiotactic polystyrene can be prepared as described in literature, for example according to what is described in European patent EP 272.584 or U.S. Pat. No. 4,978,730, by polymerization catalyzed by compounds of Ti, Zr, V, Ni, in the presence of a co-catalyst represented by methylaluminoxane (a mixture of cyclic and linear oligomers containing the repetitive units —AlCH$_3$O—) or, as described in published European patent application 421.659, from derivatives of boron containing fluorinated groups.

Examples of catalysts for the synthesis of syndiotactic polystyrene mentioned in literature are titanium halides (chloride, bromide, etc.), titanium alcoholates (methoxide, ethoxide, propoxide, isopropoxide, butoxide etc.), titanium carboxylates, metallocenes (cyclopentadienyl titanium trichloride, cyclopentadienyl titanium dichloride, pentamethylcyclopentadienyl titanium trichloride, cyclopentadienyl titanium alkoxides, cyclopentadienyl titanium alkyls, pentamethylcyclopentadienyl titanium alkyls, dicyclopentadienyl titanium dichloride, dicyclopentadienyl titanium alkoxides, etc.), titanium alkyls (titanium tetrabenzyl, titanium tetramethyl, titanium tetraethyl, etc.) and the corresponding compounds of zirconium.

The Applicant has now found that it is possible to synthesize crystalline vinylaromatic polymers, and in particular crystalline polystyrene, having a predominantly syndiotactic configuration using a new catalytic system which has never been described in literature.

The present invention therefore relates to a process for the preparation of crystalline vinylaromatic polymers having a predominantly syndiotactic structure which comprises polymerizing the vinylaromatic monomers, alone or mixed with at least another copolymerizable ethylenically unsaturated monomer, in the presence of a catalytic system essentially consisting of:

a) an adduct between a derivative of titanium having the formula $R_1R_2R_3R_4Ti$ and a calix-[n]-arene, or an oxacalix-[n]-arene, having general formula (I):

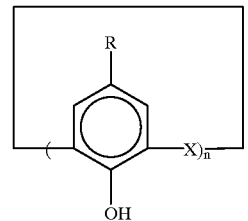

(I)

wherein $R_1, R_2, R_3$ and $R_4$, the same or different, represent a halogen, a $C_1$–$C_4$ alkyl radical, a $C_1$–$C_4$ (iso)alkoxylic radical, a cyclopentadienyl group or a dialkylamino group in which the alkyl radical contains from 1 to 4 carbon atoms;

R represents a halogen, such as chlorine, or a $C_1$–$C_4$ (iso)alkyl radical, X is selected from bifunctional —$CY_1Y_2$— or —$CY_1Y_2$—O—$CY_1Y_2$ radicals in which the substituents $Y_1$ and $Y_2$, the same or different, represent a hydrogen atom, a methyl or a phenyl group, n is an integer between 3 and 8;

b) a co-catalyst selected from an alkylalumoxane and a compound of boron having the formula:

$$BX_1X_2X_3 \quad (II)$$

or its salt, wherein $X_1$, $X_2$ and $X_3$, the same or different, represent a $C_1$–$C_{20}$ fluorinated hydrocarbon radical.

The compounds having general formula (I) are known products described in Inorganic Chemistry, 1994, Vol. 33, 4750; Journal of Organic Chemistry, 1994, Vol. 59, 4841; Tetrahedron 5725, 24, 1987; Angewandte Chemie International Edition, 713, Vol. 34, 1995. These products can be prepared in two steps by reacting, in the first step, phenols having the formula

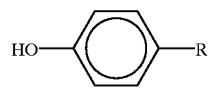

with carbonyl compounds $Y_1Y_2CO$, at a stoichiometric value of 1:1 or 1:2, in an alkaline water environment and at room temperature.

The product obtained, which is isolated, is then subjected to treatment with acids, for example with methanesulfonic acid, in an ether solvent, for example dimethoxyethane, to give the compounds having formula (I) with yields of 30%.

Typical examples of derivatives of titanium having the formula $R_1R_2R_3R_4Ti$ which are particularly suitable in the present invention are: $TiCl_4$, $CH_3OTiCl_3$, $C_2H_5OTiCl_3$, $C_3H_7OTiCl_3$, i-$C_3H_7OTiCl_3$, $C_4H_9OTiCl_3$, $(CH_3O)_3TiCl$, $(C_2H_5O)_3TiCl$, $(C_3H_7O)_3TiCl$, (i-$C_3H_7O)_3TiCl$, $(C_4H_9O)_3TiCl$, $(CH_3)_2NTiCl_3$, $(C_2H_5)_2NTiCl_3$, $(C_3H_7)_2NTiCl_3$, (i-$C_3H_7)_2NTiCl_3$, $(CH_3O)_4Ti$, $(C_2H_5O)_4Ti$, $(C_3H_7O)_4Ti$, (i-$C_3H_7O)_4Ti$, $(C_4H_9O)_4Ti$, $[(CH_3)_2N]_4Ti$, $[(C_2H_5)_2N]_4Ti$, $[(C_3H_7)_2N]Ti$, [(i-$C_3H_7)_2N]Ti$, $[(C_4H_9)_2N]_4Ti$, etc.

Examples of products having general formula (I) are: calix-[3]-arene, calix-[4]-arene, calix-[5]-arene, calix-[6]-arene, calix-[7]-arene, calix-[8]-arene, p-methylcalix-[3]-arene, p-methylcalix-[4]-arene, p-methylcalix-[5]-arene, p-methylcalix-[6]-arene, p-methylcalix-[7]-arene, p-methylcalix-[8]-arene, p-tert-butylcalix-[3]-arene, p-tertbutylcalix-[4]-arene, p-tert-butylcalix-[5]-arene, p-tert-butylcalix-[6]-arene, p-tert-butylcalix-[7]-arene, p-tert-butylcalix-[8]-arene, oxacalix-[3]-arene, oxacalix-[4]-arene, oxaca-lix-[5]-arene, oxacalix-[6]-arene, oxacalix-[7]-arene, oxacalix-[8]-arene, p-methyloxacalix-[3]-arene, p-methyloxacalix-[4]-arene, p-methyloxacalix-[5]-arene, p-methyloxacalix-[6]-arene, p-methyloxacalix-[7]-arene, p-methyloxacalix-[8]-arene, p-tert-butyloxacalix-[3]-arene, p-tert-butyloxacalix-[4]-arene, p-tert-butyloxa-calix-[5]-arene, p-tert-butyloxacalix-[6]-arene, p-tert-butyloxacalix-[7]-arene, p-tert-butyloxacalix-[8]-arene, etc.

The molar ratio between vinylaromatic monomer and titanium is not particularly critical but can vary from 1,000 to 200,000, preferably from 5,000 to 100,000.

The alkylalumoxane co-catalyst can be linear or cyclic. In the first case it is selected from products having general formula (III):

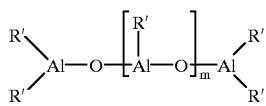
(III)

whereas in the second case from those having general formula (IV):

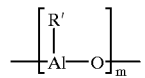
(IV)

wherein m represents an integer between 1 and 40 and R' a $C_1-C_{20}$, preferably $C_1-C_8$, alkyl radical; a $C_6-C_{20}$, preferably $C_6-C_{12}$, aryl radical; a $C_7-C_{20}$, preferably $C_7-C_{12}$ arylalkyl or alkylaryl radical; or a $C_3-C_{20}$, preferably $C_5-C_8$ cycloalkyl radical; or an O—R' radical, wherein R' represents a $C_1-C_8$, preferably $C_1-C_4$, alkyl radical; a $C_6-C_{20}$, preferably $C_6-C_{12}$ aryl radical; or a halogen atom such as chlorine, fluorine or bromine, provided not all the $R_1$ radicals are contemporaneously O—R' or halogens.

The above co-catalysts, having general formulae (III) and (IV), are known in literature and described, for example, in published European patent applications 272.584 and 421.659 or in U.S. Pat. No. 4,978,730.

The co-catalyst having general formula (II), or its salt, is known in literature and is described in published European patent applications 421.659 and 482.934.

Preferred co-catalysts having general formulae (II), (III) or (IV) are tris(pentafluorophenyl)boron and linear methylalumoxane wherein n is between 10 and 20 or cyclic methylalumoxane wherein n is between 10 and 20. The co-catalyst is generally used in such quantities that the molar ratio alumino/titanium is between 50 and 1000 or the ratio boron/titanium is between 0.5 and 5.

According to the process of the present invention, the catalytic system described above can also comprise, optionally, an aluminium alkyl in which the alkyl group contains from 1 to 6 carbon atoms, for example aluminium trimethyl, aluminium triethyl, aluminium triisobutyl, etc., in such quantities that the molar ratio aluminium alkyl/titanium is between 0 and 1,000.

The term "vinylaromatic polymers" as used in the present description and claims essentially refers to polymers of styrene and derivatives of styrene and the relative copolymers containing up to 20% in moles of another copolymerizable monomer selected from those having general formula (V):

$$CH_2=CH—R''$$ (V)

wherein R'' represents a hydrogen atom or a $C_1-C_6$ alkyl radical or a $C_4-C_{12}$ cycloalkyl radical.

Derivatives of styrene comprise alkyl styrenes, in which the alkyl group contains from 1 to 4 carbon atoms, halogenated styrenes, $C_1-C_4$ alkoxy styrenes, carboxy styrenes, vinylnaphthalenes, such as alpha- or beta-vinyl naphthalene, vinyl tetrahydro naphthalene such as 1,2,3,4-tetrahydro-6-vinyl naphthalene, etc. Typical examples of substituted styrenes are p-methylstyrene, m-methylstyrene, alone or mixed with each other, ethylstyrene, butylstyrene, p-ter-butylstyrene, dimethylstyrene, chlorostyrene, bromostyrene, fluorostyrene, chloromethylstyrene, methoxystyrene, acetoxy methylstyrene, etc.

The polymerization reaction can be carried out in mass or in solvent. In the second case, the solvent can consist of aliphatic or aromatic hydrocarbons or their mixtures and is used in such quantities that the ratio by volume solvent/monomers is between 0 and 10. The preferred solvent is toluene.

More specifically, according to the general procedure adopted for this type of reaction, the vinylaromatic monomers are subjected to treatment, before polymerization, to eliminate catalytic poisons, such as phenol stabilizers, water, phenylacetylene, and consisting in distillation, passage over columns containing activated molecular sieves or activated alumina, etc. The monomers and, optionally, the solvent are charged into the reaction equipment together with the possible aluminium alkyl and co-catalyst. After a time varying from 5 seconds to 30 minutes a solution of the adduct (a) between the derivative of titanium and the compound having general formula (I) is added. The reaction proceeds for times varying from 15 minutes to 10 hours at temperatures of between 20 and 100° C. At the end, the polymer obtained is recovered using the traditional methods.

The following examples, which are illustrative but not limiting, are provided to give a better understanding of the present invention and for its embodiment.

Analysis procedures:
The percentage of syndiotactic polymer is determined by extracting the polymer with acetone or methylethylketone (MEK) at boiling point for 10–20 hours.
The degree of stereoregularity is determined by nuclear magnetic resonance spectroscopy of carbon 13 as described in U.S. Pat. No. 4,680,353.
The thermal transition temperatures (Tm=melting point, Tg=glass transition temperature, Tcc=crystallization temperature from the molten product (drop rate 10° C./min)) are determined by differential scanning calorimetry.
The molecular weights of the polymers obtained were determined by Gel Permeation Chromatography in trichlorobenzene at 135° C.

For the embodiment of the following examples, p-tert-butyloxacalix-[3]-areneoxy titanium isopropoxide was used as catalyst. This adduct was prepared with the traditional methods by reacting titanium tetraisopropoxide with p-tert-butyloxacalix-[arene] in a solution of methylene chloride at room temperature. The structure of the adduct, isolated and crystallized, was verified by NMR spectroscopy.

EXAMPLE 1

20 ml of styrene, purified by passage over a column of basic alumina, and 1.2 ml of a 1.57M solution in toluene of methylaluminoxane were charged, in an inert atmosphere, into a tailed test-tube. After 5 minutes 3 ml of a 0.0021M solution in toluene of p-tert-butyloxacalix-[3]-areneoxy titanium isopropoxide were added.

The reaction was carried out for 5 hours at 60° C. At the end, the mixture was suspended in 200 ml of methanol, containing 2 ml of concentrated HCl, and filtered. The solid was again suspended in methanol, filtered and dried under vacuum. 2.85 g (yield 15.7%) of syndiotactic polystyrene were obtained.

Fraction insoluble in methylethylketone (MEK): 83%

The 13-C NMR analysis shows that the polymer has a percentage of syndiotactic dyads of 99.5%.

Thermal properties: Tm=268° C. Tg=100;

Weight average molecular weight Mw: 266,000;

Number average molecular weight Mn: 132,000.

EXAMPLE 2

20 ml of styrene, purified by passage over a column of basic alumina, and 2.4 ml of a 1.57M solution in toluene of methylaluminoxane were charged, in an inert atmosphere, into a tailed test-tube. After 5 minutes 6 ml of a 0.00275M solution in toluene of p-tert-butyloxacalix-[3]-areneoxy titanium isopropoxide were added.

The reaction was carried out for 5 hours at 60° C. At the end, the mixture was suspended in 200 ml of methanol, containing 2 ml of concentrated HCl, and filtered. The solid was again suspended in methanol, filtered and dried under vacuum. 2.72 g (yield 15%) of syndiotactic polystyrene were obtained.

Fraction insoluble in methylethylketone (MEK): 74%

The 13-C NMR analysis shows that the polymer has a percentage of syndiotactic dyads of 99.6%.

Thermal properties: Tm=270° C. Tg=100;

Weight average molecular weight Mw: 230,000;

Number average molecular weight Mn: 86,000.

What is claimed is:

1. A process for the preparation of crystalline vinylaromatic polymers with a predominantly syndiotactic structure which comprises polymerizing vinylaromatic monomers, alone or mixed with at least another copolymerizable ethylenically unsaturated monomer, in the presence of a catalytic system consisting essentially of:

a) an adduct between a derivative of titanium having the formula $R_1R_2R_3R_4Ti$ and a calix-[n]-arene, or an oxacalix-[n]-arene, having formula (I):

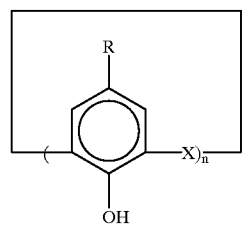

(I)

wherein $R_1, R_2, R_3$ and $R_4$, the same or different, represent a halogen, a $C_1$–$C_4$ alkyl radical, a $C_1$–$C_4$ (iso) alkoxylic radical, a cyclopentadienyl group or a dialkylamino group in which the alkyl radical contains from 1 to 4 carbon atoms;
   R represents a halogen, or a $C_1$–$C_4$ (iso)alkyl radical, X is selected from bifunctional —$CY_1Y_2$— or —$CY_1Y_2$—O—$CY_1Y_2$— radicals in which the substituents $Y_1$ and $Y_2$, the same or different, represent a hydrogen atom, a methyl or a phenyl group, n is an integer between 3 and 8;

b) a co-catalyst selected from an alkylalumoxane and a compound of boron having the formula (II):

$$BX_1X_2X_3 \qquad (II)$$

or its salt, wherein $X_1$, $X_2$ and $X_3$, the same or different, represent a $C_1$–$C_{20}$ fluorinated hydrocarbon radical.

2. The process according to claim 1, wherein the molar ratio between vinylaromatic monomer and titanium is between 1,000 and 200,000.

3. The process according to claim 1, wherein the co-catalyst is used in such quantities that the molar ratios of aluminum/titanium and boron/titanium are respectively in the range of from 50 to 1000 and of from 0.5 to 5.

4. The process according to claim 1, wherein the catalytic system described above comprises an aluminium alkyl wherein the alkyl group contains from 1 to 6 carbon atoms.

5. The process according to claim 4, wherein the molar ratio aluminium alkyl/titanium is between 0 and 1,000.

6. The process according to claim 1, wherein the polymerization reaction is carried out in mass or in solvent.

7. The process according to claim 6, wherein the solvent is used in such quantities that the ratio by volume solvent/monomers is between 0 and 10.

8. The process according to claim 1, wherein the polymerization is carried out at temperatures of between 20 and 100° C.

* * * * *